(12) United States Patent
Ju et al.

(10) Patent No.: US 9,692,200 B2
(45) Date of Patent: Jun. 27, 2017

(54) FIBER LASER

(71) Applicant: Maxphotonics Corporation, Shenzhen (CN)

(72) Inventors: Jian Ju, Shenzhen (CN); Yiran Liu, Shenzhen (CN); Quanfa Li, Shenzhen (CN); Wei Li, Shenzhen (CN); Hong Chen, Shenzhen (CN); Feng Jiang, Shenzhen (CN)

(73) Assignee: MAXPHOTONICS CORPORATION, Shenzhen (CN)

( * ) Notice: Subject to any disclaimer, the term of this patent is extended or adjusted under 35 U.S.C. 154(b) by 0 days.

(21) Appl. No.: 15/168,098

(22) Filed: May 30, 2016

(65) Prior Publication Data
US 2017/0155226 A1    Jun. 1, 2017

(30) Foreign Application Priority Data
Nov. 30, 2015  (CN) .......................... 2015 1 0861306

(51) Int. Cl.
*H01S 3/067*       (2006.01)
*G02B 6/02*        (2006.01)
(Continued)

(52) U.S. Cl.
CPC ........ *H01S 3/06758* (2013.01); *H01S 3/0405* (2013.01); *H01S 3/06704* (2013.01); *H01S 3/06729* (2013.01); *H01S 3/094003* (2013.01)

(58) Field of Classification Search
CPC ............. H01S 3/06704; H01S 3/06758; G02B 6/02009; G02B 6/02014; G02B 6/02019; G02B 6/02023
See application file for complete search history.

(56) References Cited

U.S. PATENT DOCUMENTS 4,915,468 A * 4/1990 Kim ........................ G01D 5/344
                                                            385/123
6,144,792 A * 11/2000 Kim ..................... H01S 3/06704
                                                            385/134
(Continued)

FOREIGN PATENT DOCUMENTS

CN         102147551 A      8/2011
CN         103944056 A      7/2014
WO         WO0169313 A1     9/2001

*Primary Examiner* — Erica Bolda
(74) *Attorney, Agent, or Firm* — Gokalp Bayramoglu

(57) ABSTRACT

The present disclosure discloses a fiber laser, including a laser seed source, an amplifying optical path, an output optical isolator and an optical fiber cylinder; wherein, the amplifying optical path is connected to the laser seed source and the output optical isolator, the laser seed source is used to output optical source, the amplifying optical path includes a first stage amplifying optical path and a second stage amplifying optical path, the first stage amplifying optical path is connected to the laser seed source and the second stage amplifying optical path respectively, the output optical source is output via the output optical isolator after two-stage amplifying; the second stage amplifying optical path comprises a multi-mode active optical fiber; the multi-mode active optical fiber is coiled on the optical fiber cylinder. By the disposing way above, the present disclosure may improve output optical beam quality of the fiber laser.

9 Claims, 3 Drawing Sheets

(51) Int. Cl.
*H01S 3/04* (2006.01)
*H01S 3/094* (2006.01)

(56) References Cited

U.S. PATENT DOCUMENTS

| | | | | |
|---|---|---|---|---|
| 6,496,301 B1 * | 12/2002 | Koplow | .................. | G02B 6/14 |
| | | | | 359/337 |
| 7,400,812 B2 * | 7/2008 | Seifert | ................. | G02B 6/4457 |
| | | | | 385/12 |
| 8,493,651 B1 * | 7/2013 | Hu | ...................... | H01S 3/06754 |
| | | | | 359/341.1 |
| 2009/0060444 A1 * | 3/2009 | Muendel | .............. | G02B 6/3636 |
| | | | | 385/137 |
| 2009/0080835 A1 * | 3/2009 | Frith | ........................ | G02B 6/14 |
| | | | | 385/50 |
| 2013/0230061 A1 * | 9/2013 | Dong | ................. | H01S 3/06704 |
| | | | | 372/6 |
| 2015/0249311 A1 * | 9/2015 | Rowen | ............... | H01S 3/0064 |
| | | | | 359/337 |
| 2016/0285229 A1 * | 9/2016 | Krause | ............... | H01S 3/09415 |

* cited by examiner

FIBER LASER

CROSS-REFERENCE TO RELATED APPLICATIONS

This application is based upon and claims priority to Chinese Patent Applications No. CN201510861306.0 filed Nov. 30, 2015, the entire contents of all of which are incorporated herein by reference.

FIELD OF TECHNOLOGY

The present disclosure relates to mechanical design technology area of laser device and, more particularly, to a fiber laser.

BACKGROUND

Fiber laser refers to a technique of laser-leveled population inversion of laser material caused by high power-density in the optical fiber under the function of pump light, glass optical fiber doped with rare-earth elements are used as gain medium. A positive feedback circuit may be added at proper time to form laser oscillation output.

In the fiber laser, the power thereof and the laser beam quality are two contradictive parameters, that is, the larger the power is, the worse the laser beam quality is; the smaller the power is, the better the laser beam quality is. Currently, users have to choose between the power and the laser beam quality, they may obtain a high power and poor quality one, or a lower power and high quality one. This greatly limits the using scope of the fiber laser and is not benefit for promotion application and the fiber laser.

SUMMARY

The problem that the present disclosure mainly solves is, providing a fiber laser which may have improved light beam quality without reducing the power of the fiber laser.

To solve the problem, one of the technical solution is: providing a fiber laser comprising a laser seed source, an amplifying optical path, an output optical isolator and an optical fiber cylinder; wherein, the amplifying optical path is connected to the laser seed source and the output optical isolator, the laser seed source is used to output optical source, the amplifying optical path includes a first stage amplifying optical path and a second stage amplifying optical path, the first stage amplifying optical path is connected to the laser seed source and the second stage amplifying optical path respectively, the output optical source is output via the output optical isolator after two-stage amplifying; the second stage amplifying optical path comprises a multi-mode active optical fiber; the multi-mode active optical fiber is coiled on the optical fiber cylinder.

In an embodiment of the present disclosure, the optical fiber cylinder further comprises a first cylinder and/or a plurality of second cylinders, the first cylinder is larger than the each of the second cylinders.

Wherein, a first groove is disposed at the outer surface of the first cylinder, the multi-mode active optical fiber is coiled along the first groove spirally.

In an embodiment of the present disclosure, the second cylinders are disposed in a circumference, the multi-mode active optical fiber is coiled on the second cylinders in a wave shape.

In an embodiment of the present disclosure, a second groove is disposed at the second cylinder, when the multi-mode active optical fiber is coiled on the second cylinder, the multi-mode active optical fiber is embedded in the second groove.

In an embodiment of the present disclosure, the first cylinder is disposed in a circle formed by the second cylinders, the multi-mode active optical fiber is coiled on the first cylinder after it is coiled on the second cylinders in the wave shape, and an output end of the multi-mode active optical fiber is located at the top of the first cylinder.

In an embodiment of the present disclosure, the fiber laser comprises an upper casing and a lower casing; the laser seed source and the first stage amplifying optical path are fixed to the upper casing, the second stage amplifying optical path, the output optical isolator and the optical fiber cylinder are fixed to the lower casing, the upper casing is fixed to the lower casing.

In an embodiment of the present disclosure, the first stage amplifying optical path includes a first stage pump optical fiber, a single-mode active optical fiber and a first stage passive optical fiber, the fiber laser further comprises an optical fiber closure and a heat dissipating glue; the optical fiber closure and the heat dissipating glue are located in the upper casing, the single-mode active optical fiber is fixed in the optical fiber closure, the heat dissipating glue is coated on the single-mode active optical fiber; the first stage pump optical fiber and the first stage passive optical fiber are located in the upper casing, and the first stage pump optical fiber is around the optical fiber closure, the first stage passive optical fiber is away from the first stage pump optical fiber and the optical fiber closure.

In an embodiment of the present disclosure, the first stage amplifying optical path comprises a first stage pump source, a first stage combiner, a first stage amplifier and a first stage optical isolator; the laser seed source is connected to the first stage combiner via the single-mode active optical fiber, the first stage pump source is connected to the first stage combiner via the first stage pump optical fiber, the first stage amplifier is connected to the first stage combiner and the first stage optical isolator respectively via the first stage passive optical fiber, the first stage optical isolator is connected to the second stage amplifying optical path.

In an embodiment of the present disclosure, the second stage amplifying optical path further comprises a second stage pump optical fiber, a second stage pump source, a second stage combiner, a second stage amplifier and a second stage passive optical fiber; the second stage combiner is connected to the first stage optical isolator via the multi-mode active optical fiber, the second stage pump source is connected to the second stage combiner via the second stage pump optical fiber, the second stage amplifier is connected to the second stage combiner and the output optical isolator respectively via the second stage passive optical fiber.

The beneficial effect of the present disclosure lies in: compared with the prior art, in the present disclosure, the multi-mode active optical fiber of the amplifying optical path of the fiber laser is coiled on the optical fiber cylinder to make the radius of the multi-mode active optical fiber to be curve, the high-order mode of the multi-mode active optical fiber is filtered and the low-order mode and even the fundamental mode of the multi-mode active optical fiber are obtained and output, thereby improving the light beam quality of laser output from the multi-mode active optical fiber, which improves the quality of output laser beam of the fiber laser without reducing the power of the fiber laser.

DESCRIPTION OF THE EMBODIMENTS

Hereinafter, the present disclosure is illustrated with accompanying drawings and embodiments.

Figure 1:
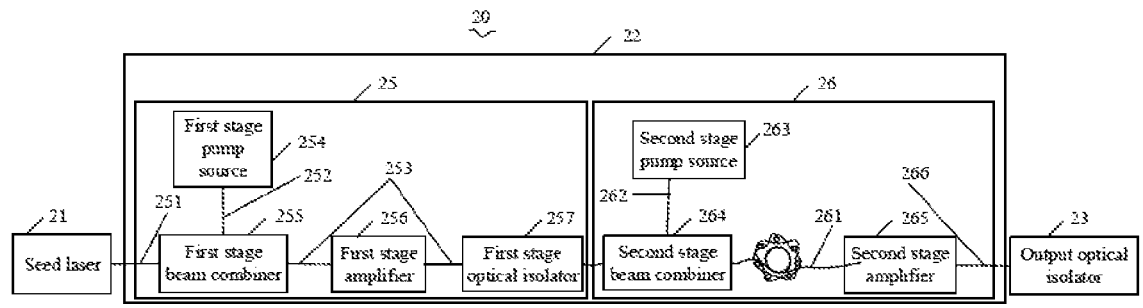
FIG. 1 is a connection relation diagram showing part of the elements in the fiber laser in an embodiment of the present disclosure.
Figure 2:
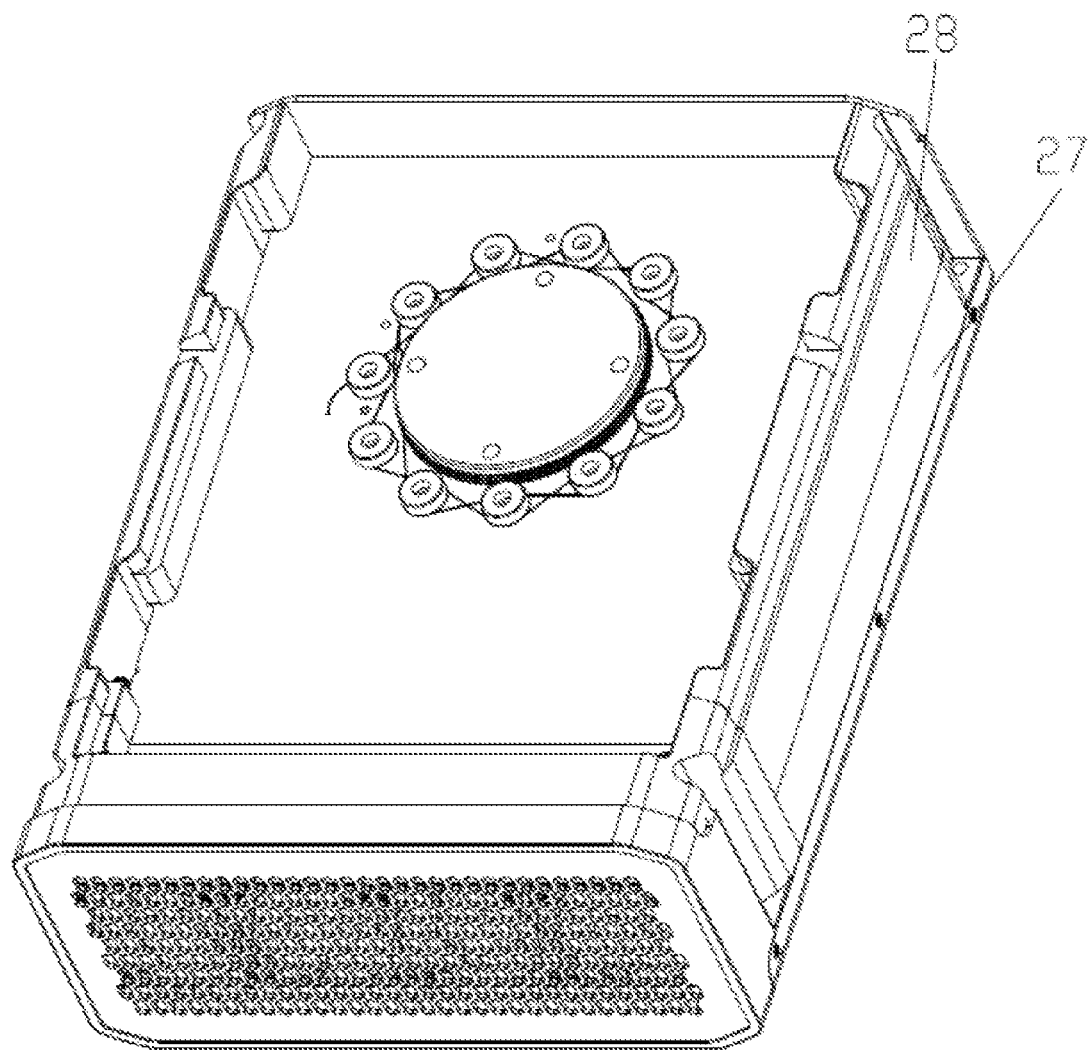
FIG. 2 is a three-dimensional schematic diagram showing the fiber laser in the embodiment of the present disclosure.
Figure 3:
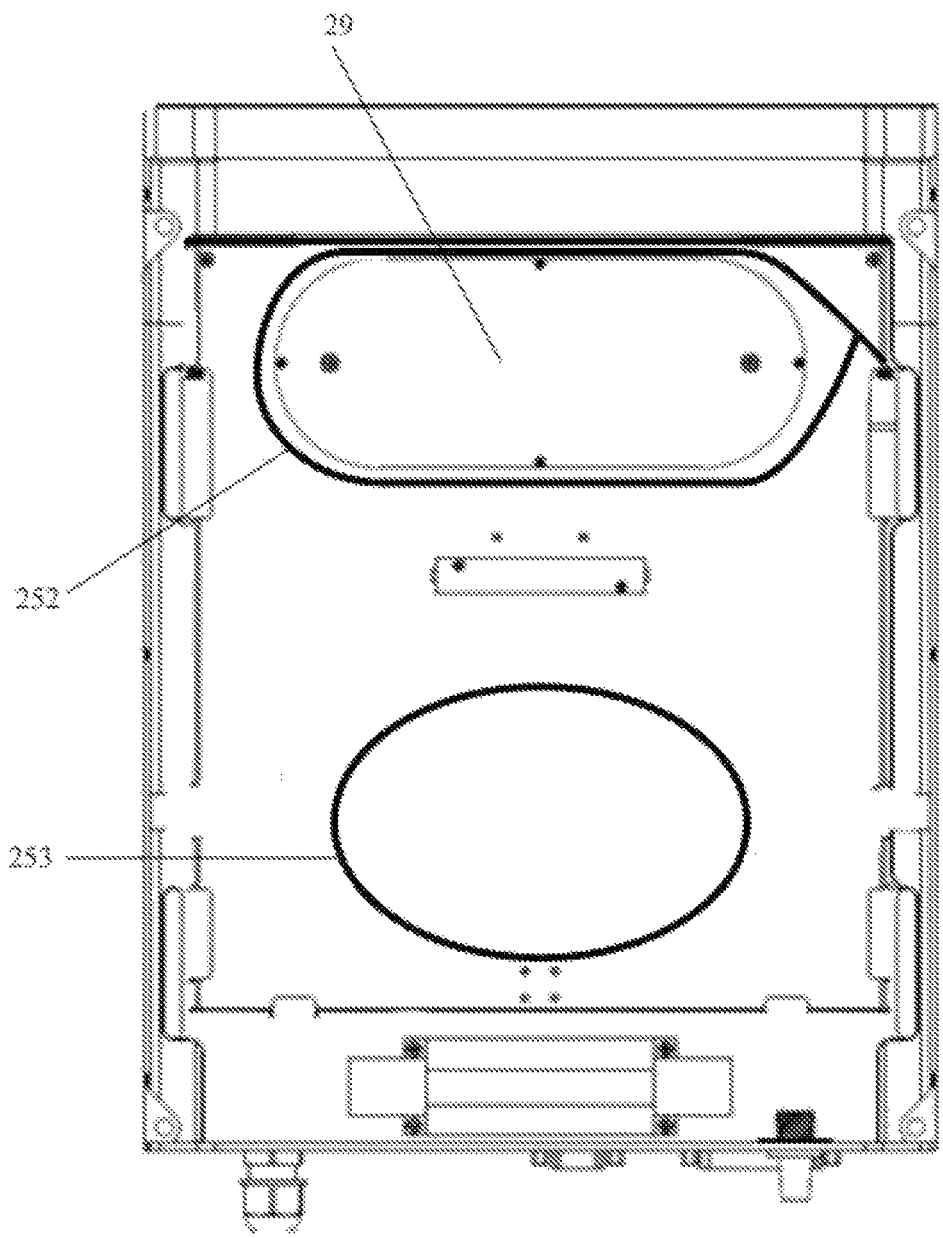
FIG. 3 is a sectional diagram showing the upper casing of the fiber laser in an embodiment of the present disclosure.
Figure 4:
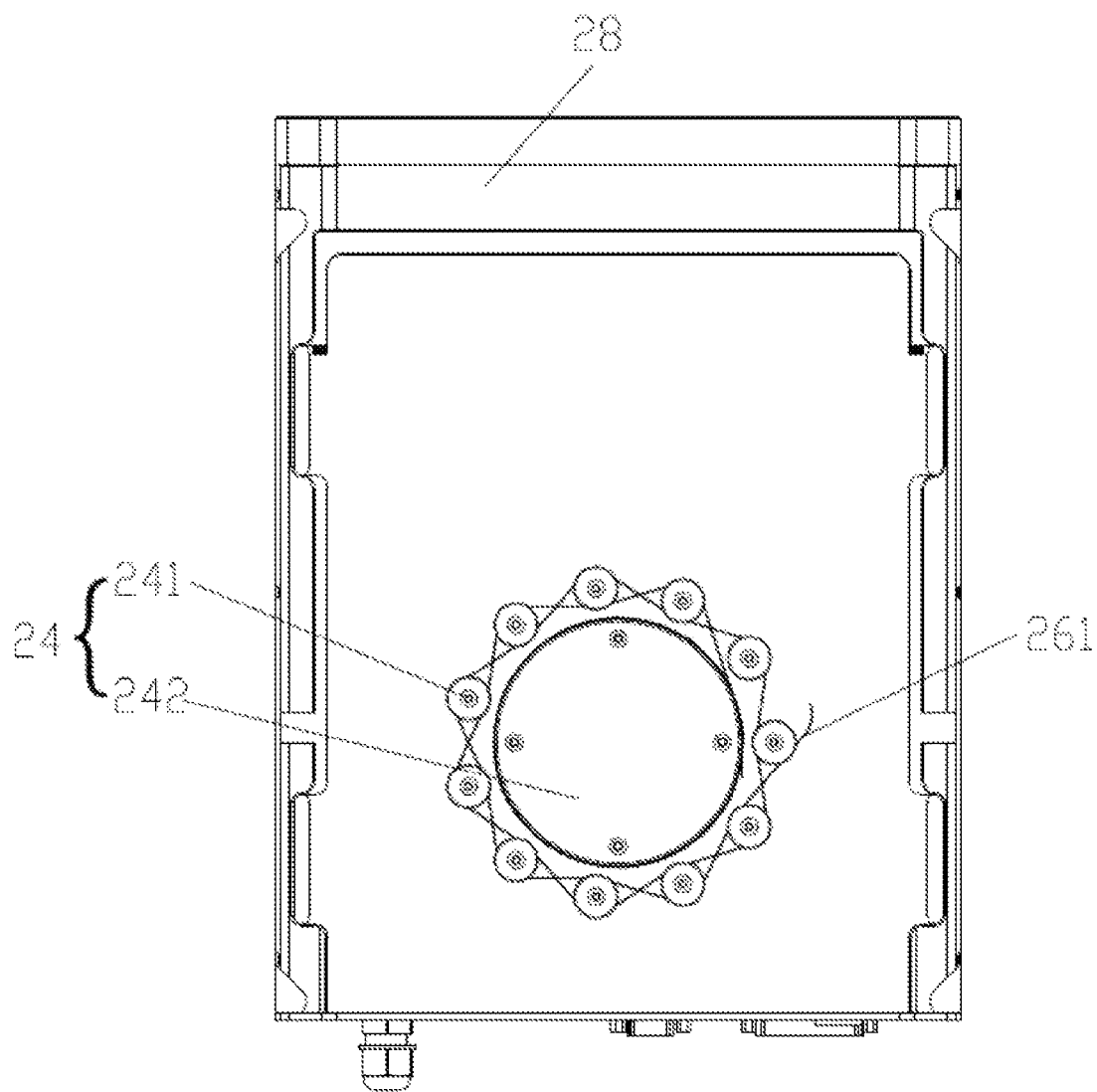
FIG. 4 is a sectional diagram showing the first cylinder of the fiber laser in an embodiment of the present disclosure.

Referring to FIG. 1 to FIG. 3, the fiber laser 20 includes a laser seed source 21, an amplifying optical path 22, an output optical isolator 23 and an optical fiber cylinder 24.

The amplifying optical path 22 is connected to the laser seed source 21 and the output optical isolator 23 respectively. The laser seed source 21 is used to output optical source, the amplifying optical path 22 is used to amplify the optical source and output via the output optical isolator 23. The output optical isolator 23 is an apparatus which only allows the light to transmit along a fixed direction. The amplifying optical path 22 includes a first stage amplifying optical path 25 and a second stage amplifying optical path 26, the first stage amplifying optical path 25 is connected to the laser seed source and the second stage amplifying optical path 26 respectively, the second stage amplifying optical path 26 is connected to the first stage amplifying optical path 25 and the output optical isolator 23 respectively, the output optical source is output via the output optical isolator 23 after two-stage amplifying. The amplifying optical path 22 includes a multi-mode active optical fiber 261. The multi-mode active optical fiber 261 is coiled on the optical fiber cylinder 24. The optical fiber cylinder 24 is a cylinder component. When the multi-mode active optical fiber 261 is coiled on the optical fiber cylinder 24, the radius of the multi-mode active optical fiber 261 is curved, the high-order mode of the multi-mode active optical fiber 261 is filtered and the low-order mode and even the fundamental mode of the multi-mode active optical fiber 261 are obtained and output, thereby improving the light beam quality of laser output from the multi-mode active optical fiber 261, which further improves the quality of output laser beam of the fiber laser 20 without reducing the power of the fiber laser.

The specific principle of improving the light beam quality of the laser output from the multi-mode active optical fiber 261 by curving the radius of the curved multi-mode active optical fiber 261 is:

The parameter (especially the light beam quality $M^2$) of optical beam of laser and the average power makes determination effect on the application of laser device. However, in the fiber laser 20, the average power and the light beam quality are two contradictive parameters, that is the larger the average power is, the worse the laser beam quality is; the smaller the power is, the better the laser beam quality is. The light beam quality $M^2$ may be calculated by:

$$M^2 = \frac{\text{actual beam waist diameter} \times \text{actual far field divergence angle}}{\text{ideal Gauss beam waist diameter} \times \text{ideal divergence angle}}$$

The product of the light beam width of the light beam in space area and the far field divergence angle is called space beam width product, or called light beam parameter product, the calculation formula of the light beam quality $M^2$ may also be:

$$M^2 = \frac{w \cdot \theta}{w_0 \cdot \theta_0} \qquad \text{Formula 1}$$

w is the Gaussian beam waist width of the detected light beam, $w_0$ is a beam waist width of the fundamental mode ideal Gaussian beam, $\theta$ and $\theta_0$ are far field divergence angles of the detected light beam and fundamental mode ideal Gaussian beam, light beam quality $M^2=1$ is the best fundamental mode Gaussian beam, under ideal condition, $M^2$ factor is an invariant when the Gaussian beam passes a focused optical system having no aberration and no diffraction effect or passed a beam expanding system.

In addition, as known from the dielectric waveguide theory, when the optical fiber is bent, signal laser may have power radiation along bending radius direction, a part of propagation mode in the optical fiber previously may become leaky mode and radiation mode, which may case bending loss. According to classical theory of D. Marcuse, the bending loss of LPmn mode in the optical fiber may be expressed as:

$$2a_c = \frac{\sqrt{\pi}\, U^2 \exp[-2W^{3R}/3a^3\beta^2]}{e_m W^{3/2}\sqrt{aR}\, V^2 K_{m-1}(W) K_{m+1}(W)} \qquad \text{Formula 2}$$

In formula 2, $U=\sqrt{k^2 n_1^2 - \beta^2}\alpha$, $W=\sqrt{\beta^2 - k^2 n_2^2}\alpha$ and $V=\sqrt{k^2 n_1^2 - k_2 n_2^2}\alpha$ are normalized frequencies, R is the bending radius, $\alpha$ is fiber core radius, $\beta$ is a corresponding transmitting constant, m represents the order of the mode LPmn, K is wave number in vacuum, $e_m$ is a constant, whose value differs according to the mode. The Formula of $e_m$ may be expressed as:

$$e_m = \begin{cases} 2 & (m=0) \\ 1 & (m=2) \end{cases} \qquad \text{Formula 3}$$

Figure 5:
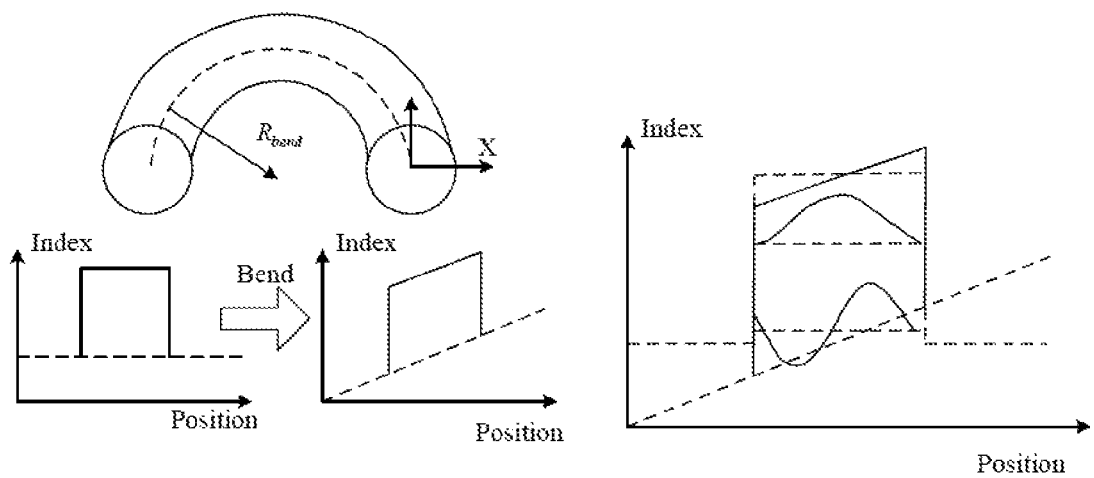
FIG. 5 is a schematic diagram showing the curving equivalent refractive index model of the multi-mode active optical fiber in the fiber laser in an embodiment of the present disclosure.

As known from Formula 2 and Formula 3, the loss increases along with the reduce of bending radius of the optical fiber, and the loss of high-order mode is larger than that of the low-order mode. The different losses between modes may be explained intuitively by an optical fiber bending equivalent refractive index model: as shown in FIG. 5, bending along the axis affecting the optical filed inside the fiber core of the optical fiber may be seen as a change of refractive index, that is, equivalent refractive index of the high-order mode is lower than that of the fundamental mode, and it is easy to have leakage to generate larger loss. Therefore, in the optical fiber, when the multi-mode active optical fiber 261 is bent according to proper radius, it is capable to filter the high-order mode to obtain the low-order mode and even fundamental mode to output, thus improving light beam quality of output laser. Obviously, in other alternative embodiments, it is also capable to use other method to improve the light beam quality of the fiber laser 20, but there are still some disadvantages. For example, 1) in a micro structure technology, a photonic crystal fiber is provided, which has the advantage of having high design freedom, having endless single mode, having largely increased mode filed area, but the manufacturing cost is high, the flexibleness of the optical fiber is reduced, therefore the photonic crystal fiber is not used frequently. 2) in the conventional designing, the fiber core radius is increased and the refractive differences between the optical fiber core and the cladding is reduced, this made the product easy to operate and manufacture, but the product is easy to be affected by bending loss. 3) in a composite guide technology, gaining the guide may obtain a larger mode field area but it is easy to be affected by outside factors (temperature, bending degree and so on), and the stableness is not preferable. 4) in a mode control technology, which may include a tapered fiber filter technology and a mode conversion technology. In the previous one, the manufacturing difficulty is low, but the power density distribution is uneven, in the latter one, the effect is preferable, but the structure is complex, the manufacturing process is not mature and the stableness is poor.

Specifically, the optical fiber cylinder 24 includes a plurality of second cylinders 241 and/or a first cylinder 242, the first cylinder is larger than the second cylinders. The second cylinders 241 are disposed to form a circle, the multi-mode active optical fiber 261 is coiled on the second cylinders 241 in a wave shape. Wherein when the multi-mode active optical fiber 261 passes between two neighboring second cylinders 241 in the wave shape, the multi-mode active optical fiber 261 is wave-shaped, that is, when the multi-mode active optical fiber 261 passes the second cylinders 241, the multi-mode active optical fiber 261 contacts the one second cylinder 241 at the surface away from the first cylinder 242 and contacts its neighboring second cylinder 241 at the surface close to the first cylinder 242, which ensures each second cylinder 241 applies stress on the multi-mode active optical fiber 261, thereby increasing the output optical quality of the multi-mode active optical fiber 261. Obviously, after the multi-mode active optical fiber 261 is coiled on the circle formed by the second cylinders 241 for a round in the wave shape, it is also capable to return to be coiled on the circle formed by the second cylinders 241 for a round in the wave shape for a second time. Thus, the multi-mode active optical fiber 261 may be coiled on the circle formed by the second cylinders 241 for at least two rounds in the wave shape. Alternatively, the multi-mode active optical fiber 261 may be directly coiled on the first cylinder 242. Alternatively, when both the second cylinders 241 and the first cylinder 242 exist, the first cylinder 242 may be disposed inside the circle rounded by the second cylinders 241, the multi-mode active optical fiber 261 is coiled on the first cylinder 242 after coiled on the second cylinders 241 in the wave shape, and the output end of the multi-mode active optical fiber 261 may be disposed at the upper portion of the first cylinder 242. Wherein the multi-mode active optical fiber 261 may be coiled from the lower portion of the cylinder to the upper portion of the first cylinder 242, thereby making the output end of the multi-mode active optical fiber 261 located at the upper portion of the first cylinder 242. Obviously, the way that the multi-mode active optical fiber 261 is coiled on the optical fiber cylinder 24 may not be limited as the above ways, for example, it is capable to use a plurality of second cylinders 241 to form a larger circle and a smaller circle, and make the smaller circle located in the larger circle, the multi-mode active optical fiber 261 may be coiled on the smaller circle in the wave shape after coiled on the larger circle in the wave shape. Or, it is capable to make the second cylinder 241 movable, therefore the diameter of the circle formed by the second cylinders 241 may be adjusted according to the length of the multi-mode active optical fiber 261.

In order to lay the multi-mode active optical fiber, the outer surface of the first cylinder may have first groove (not shown), the multi-mode active optical fiber is coiled along the first groove. The second cylinders 24 may also have second grooves (not shown), when the multi-mode active optical fiber 261 is coiled on the second cylinder 241, it is embedded in the grooves. The first groove and the second groove not only facilitates the layout of the multi-mode active optical fiber 261, but also fixes the multi-mode active optical fiber 261, which avoids the multi-mode active optical fiber 261 from sliding up and down in the second cylinders 241 or/and the first cylinder.

Both the first stage amplifying optical path 25 and the second stage amplifying optical path 26 generates heat during working. To facilitate heat dissipating to the first stage amplifying optical path 25 and the second stage amplifying optical path 26, the fiber laser 20 has a double-layer structure to achieve isolating heat dissipating to the first stage amplifying optical path 25 and the second stage amplifying optical path 26. Specifically, the fiber laser 20 includes an upper casing 27 and a first cylinder 28, the laser seed source and the first stage amplifying optical path 25 are fixed to the upper casing 27, the second stage amplifying optical path 26, the output optical isolator 23 and the optical fiber cylinder 24 are fixed to the first cylinder 28, the upper casing 27 is fixed to the first cylinder 28.

The first stage amplifying optical path 25 includes a single-mode active optical fiber 251, a first stage pump optical fiber 252 and a first stage passive optical fiber 253, the fiber laser 20 also includes an optical fiber closure 29 and a heat dissipating glue (not shown). The optical fiber closure 29 and the heat dissipating glue are located in the upper casing 27, the single-mode active optical fiber 251 is fixed in the optical fiber closure 29 and the heat dissipating glue wraps the single-mode active optical fiber 251. The first stage pump optical fiber 252 and the first stage passive optical fiber 253 are fixed in the upper casing 27, and the first stage pump optical fiber 252 is around the optical fiber closure 29. The first stage passive optical fiber 253 is away from the pump optical fiber and the optical fiber closure 29. The single-mode active optical fiber 251 is the main substance for generating heat and light dissipating in the first stage amplifying optical path 25, disposing the single-mode active optical fiber 251 in the optical fiber closure 29 may avoid light scattering in the single-mode active optical fiber 251 from affecting other optical fibers, the heat dissipating glue wrapping the single-mode active optical fiber 251 may increase the heat dissipating speed of the single-mode active optical fiber 251. Obviously, the optical fiber closure 29 and the upper casing 27 may use material with preferable heat dissipating performance, to further ensure the heat generated by the single-mode active optical fiber 251 to transmit to outside space. In the embodiment, the heat dissipating glue is preferable silica gel.

The single-mode active optical fiber 251 is packaged in the optical fiber closure 29, the first stage pump optical fiber 252 is around the optical fiber closure 29, and the single-mode active optical fiber 251 is away from the optical fiber closure, which may effectively separate the single-mode active optical fiber 251, the first stage pump optical fiber 252 and the first stage passive optical fiber 253, and effectively avoids the pump light of the first stage pump light, the illuminance of the single-mode active optical fiber 251 and the signal light of the first stage passive optical fiber 253 from permeating each other. In the embodiment, the single-mode active optical fiber 251 is a low output power optical fiber, the single-mode active optical fiber 251 is single mode and has low output power, the light beam quality is excellent and it is not necessary to use the coiled structure of the optical fiber cylinder 24.

The first stage amplifying optical path 25 may further include a first stage pump source 254, a first stage combiner 255, a first stage amplifier 256 and a first stage optical isolator 257. The laser seed source 21 is connected to the first stage combiner 255 via the single-mode active optical fiber 251, the first stage pump source 254 is connected to the first stage combiner 255 via the first stage pump optical fiber 252, the first stage amplifier 256 is connected to the first stage combiner 55 and the first stage optical isolator 257 respectively via the first stage passive optical fiber 253, the first stage optical isolator 257 is connected to the second stage amplifying optical path 26.

The second stage amplifying optical path 26 further includes a second stage pump optical fiber 262, a second stage pump source 263, a second stage combiner 264, a second stage amplifier 265 and a second stage passive optical fiber 266. The second stage combiner 264 is connected to the first stage optical isolator 257 via the multi-mode active optical fiber 261, the second stage pump source 263 is connected to the second stage combiner 264 via the second stage pump optical fiber 262, the second stage amplifier 265 is connected to the second stage combiner 264 and the output optical isolator 23 via the second stage passive optical fiber 266.

In the embodiment of the present disclosure, the multi-mode active optical fiber 261 in the amplifying optical path of the fiber laser 20 is coiled on the optical fiber cylinder 24 to make the radius of the multi-mode active optical fiber curved, the high-order mode of the multi-mode active optical fiber is filtered, and the low-order mode and even the fundamental mode of the multi-mode active optical fiber 261 are obtained and output, thereby improving the light beam quality of laser output from the multi-mode active optical fiber 261, which improves the quality of output laser beam of the fiber laser 20 without reducing the power of the fiber laser 20.

The illustration above are only embodiments of the present disclosure, which is not used limit the patent scope of the present disclosure. Any equivalent structure or equivalent process modified according to the specification and drawings in the present disclosure or any utilization directly or indirectly used in other related technical fields, are all contained in the patent scope of the present disclosure.

What is claimed is:

1. A fiber laser comprising a laser seed source, an amplifying optical path, an output optical isolator and an optical fiber cylinder, wherein,
the amplifying optical path is connected to the laser seed source and the output optical isolator, the laser seed source is used to output optical source, the amplifying optical path includes a first stage amplifying optical path and a second stage amplifying optical path, the first stage amplifying optical path is connected to the laser seed source and the second stage amplifying optical path respectively, the output optical source is output via the output optical isolator after two-stage amplifying;
the second stage amplifying optical path comprises a multi-mode active optical fiber;
the multi-mode active optical fiber is coiled on the optical fiber cylinder;
wherein the fiber laser further comprises an upper casing and a lower casing,
the laser seed source and the first stage amplifying optical path are fixed to the upper casing, the second stage amplifying optical path, the output optical isolator and the optical fiber cylinder are fixed to the lower casing, the upper casing is fixed to the lower casing.

2. The fiber laser according to claim 1, wherein, the optical fiber cylinder further comprises a first cylinder, and a plurality of second cylinders, wherein the first cylinder is larger than the second cylinders.

3. The fiber laser according to claim 2, wherein a first groove is disposed at the outer surface of the first cylinder, the multi-mode active optical fiber is coiled along the first groove spirally.

4. The fiber laser according to claim 2, wherein the second cylinders are disposed in a circumference, the multi-mode active optical fiber is coiled on the second cylinders in a wave shape.

5. The fiber laser according to claim 4, wherein a second groove is disposed at the second cylinder, when the multi-mode active optical fiber is coiled on the second cylinder, the multi-mode active optical fiber is embedded in the second groove.

6. The fiber laser according to claim 2, wherein the first cylinder is disposed in a circle formed by the second cylinders, the multi-mode active optical fiber is coiled on the first cylinder after it is coiled on the second cylinders in the wave shape, and an output end of the multi-mode active optical fiber is located at the top of the first cylinder.

7. The fiber laser according to claim 1, wherein,
the first stage amplifying optical path comprises a first stage pump optical fiber, a single-mode active optical fiber and a first stage passive optical fiber, the fiber laser further comprises an optical fiber closure and a heat dissipating glue;
the optical fiber closure and the heat dissipating glue are located in the upper casing, the single-mode active optical fiber is fixed in the optical fiber closure, the heat dissipating glue is coated on the single-mode active optical fiber;
the first stage pump optical fiber and the first stage passive optical fiber are located in the upper casing, and the first stage pump optical fiber is around the optical fiber closure, the first stage passive optical fiber is separated from the first stage pump optical fiber by the optical fiber closure.

8. The fiber laser according to claim 1, wherein,
the first stage amplifying optical path comprises a first stage pump source, a first stage combiner, a first stage amplifier and a first stage optical isolator;
the laser seed source is connected to the first stage combiner via the single-mode active optical fiber, the first stage pump source is connected to the first stage combiner via the first stage pump optical fiber, the first stage amplifier is connected to the first stage combiner and the first stage optical isolator respectively via the first stage passive optical fiber, the first stage optical isolator is connected to the second stage amplifying optical path.

9. The fiber laser according to claim 1, wherein
the second stage amplifying optical path further comprises a second stage pump optical fiber, a second stage pump source, a second stage combiner, a second stage amplifier and a second stage passive optical fiber;
the second stage combiner is connected to the first stage optical isolator via the multi-mode active optical fiber, the second stage pump source is connected to the second stage combiner via the second stage pump optical fiber, the second stage amplifier is connected to the second stage combiner and the output optical isolator respectively via the second stage passive optical fiber.

* * * * *